United States Patent
Salim (10) Patent No.: US 12,341,615 B2
(45) Date of Patent: Jun. 24, 2025

(54) SIDELINK SCHEDULING IN CELLULAR NETWORKS

(71) Applicant: JRD COMMUNICATION (SHENZHEN) LTD., Guangdong (CN)

(72) Inventor: Umer Salim, Guangdong (CN)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 33 days.

(21) Appl. No.: 17/754,508

(22) PCT Filed: Sep. 27, 2020

(86) PCT No.: PCT/CN2020/117975
§ 371 (c)(1),
(2) Date: Apr. 4, 2022

(87) PCT Pub. No.: WO2021/063275
PCT Pub. Date: Apr. 8, 2021

(65) Prior Publication Data
US 2024/0106575 A1    Mar. 28, 2024

Related U.S. Application Data

(60) Provisional application No. 62/910,016, filed on Oct. 3, 2019.

(51) Int. Cl.
*H04L 1/1829* (2023.01)
*H04W 72/40* (2023.01)

(52) U.S. Cl.
CPC ........... *H04L 1/1854* (2013.01); *H04W 72/40* (2023.01)

(58) Field of Classification Search
CPC .............................. H04L 1/1854; H04W 72/40
See application file for complete search history.

(56) References Cited

U.S. PATENT DOCUMENTS

| | | | | |
|---|---|---|---|---|
| 2014/0177449 | A1* | 6/2014 | Novak | H04W 4/80 370/329 |
| 2014/0241262 | A1* | 8/2014 | Novak | H04W 72/23 370/329 |
| 2015/0131475 | A1* | 5/2015 | Van Phan | H04W 8/26 370/254 |
| 2015/0257160 | A1* | 9/2015 | Ishida | H04W 72/52 455/452.1 |
| 2017/0013639 | A1* | 1/2017 | Ma | H04L 1/1822 |
| 2017/0318615 | A1* | 11/2017 | Ou | H04B 7/026 |
| 2018/0324770 | A1 | 11/2018 | Nogami et al. | |
| 2020/0029340 | A1* | 1/2020 | He | H04W 72/25 |

(Continued)

FOREIGN PATENT DOCUMENTS

WO    2019103671 A1    5/2019

OTHER PUBLICATIONS

International Search Report in International application No. PCT/CN2020/117975, mailed on Dec. 30, 2020.

(Continued)

*Primary Examiner* — Jael M Ulysse
(74) *Attorney, Agent, or Firm* — PV IP PC; Wei Te Chung (57) ABSTRACT

Various techniques and processes for transmission of sidelink control information transmission, and in particular feedback transmission are disclosed. Methods and processes for dynamic grant and periodic resource allocations are discussed.

10 Claims, 3 Drawing Sheets

(56) References Cited

U.S. PATENT DOCUMENTS

| | | | |
|---|---|---|---|
| 2020/0187165 A1* | 6/2020 | Park | H04L 1/1858 |
| 2020/0267597 A1* | 8/2020 | Huang | H04L 1/1812 |
| 2020/0275474 A1* | 8/2020 | Chen | H04L 1/1607 |
| 2020/0322095 A1* | 10/2020 | Park | H04W 4/40 |
| 2020/0403737 A1* | 12/2020 | Yeo | H04W 52/367 |
| 2021/0006362 A1* | 1/2021 | Loehr | H04L 1/1819 |
| 2021/0007002 A1* | 1/2021 | Kang | H04W 4/70 |
| 2021/0028891 A1* | 1/2021 | Zhou | H04W 4/40 |
| 2021/0045178 A1* | 2/2021 | Kung | H04W 76/18 |
| 2021/0050954 A1* | 2/2021 | Ryu | H04W 76/14 |
| 2021/0105126 A1* | 4/2021 | Yi | H04L 1/1671 |
| 2021/0176027 A1* | 6/2021 | Desai | H04L 1/1671 |
| 2021/0297199 A1* | 9/2021 | Miao | H04B 7/063 |
| 2021/0410129 A1* | 12/2021 | Freda | H04W 72/20 |
| 2022/0085921 A1* | 3/2022 | Zhang | H04L 1/1887 |
| 2022/0174695 A1* | 6/2022 | Lee | H04L 1/1896 |
| 2022/0191847 A1* | 6/2022 | Hong | H04W 72/02 |
| 2022/0232523 A1* | 7/2022 | Lee | H04L 47/125 |
| 2022/0256518 A1* | 8/2022 | Hou | H04L 1/1825 |
| 2022/0295524 A1* | 9/2022 | Hong | H04L 5/0094 |
| 2022/0303952 A1* | 9/2022 | Hoang | H04W 72/542 |
| 2022/0330312 A1* | 10/2022 | Zhou | H04L 1/1819 |
| 2022/0376831 A1* | 11/2022 | Yoshioka | H04W 72/02 |
| 2023/0379089 A1* | 11/2023 | Loehr | H04L 1/1819 |
| 2024/0008004 A1* | 1/2024 | He | H04W 4/46 |

OTHER PUBLICATIONS

Written Opinion of the International Search Authority in international application No. PCT/CN2020/117975, mailed on Dec. 30, 2020.

Ericsson, "Feature lead summary #5 on Resource allocation for NR sidelink Mode 1", 3GPP TSG-RAN WG1 Meeting #97 R1-1907947,May 20, 2019 (May 20, 2019), pp. 4-17.

Xiaomi, "Discussion on the Coreset configuration", 3GPP TSG RAN WG1 Meeting NR#3 R1-1716564, Sep. 11, 2017 (Sep. 11, 2017), the whole document.

European Search Report in European application No. 20871607.6, mailed on Jan. 9, 2024.

Samsung: On Resource Allocation for NR V2X Mode1:, [Online] Aug. 17, 2019(Aug. 17, 2019), 3GPP Draft; R1-1908476 On Resource Allocation for NR V2X Mode 1-Samsung, 3rd Generation Partnership Project(3GPP), Mobile Competence Centre; 650, Route Des Lucioles; F-06921 Sophia-Antipolis Cedex; France, XP051765085.

Spreadtrum Communications: "Consideration on NR Uu-based sidelink resource allocation", [Online] Feb. 16, 2019(Feb. 16, 2019), 3GPP Draft; R1-1902725 Consideration On NR Uu-Based Sidelink Resource Allocation, 3rd Generation Partnership Project(3GPP), Mobile Competence Cnetre; 650, Route Des Lucioles; F-06921 Sophia-Antipolis Cedex; France, XP051600420.

* cited by examiner

SIDELINK SCHEDULING IN CELLULAR NETWORKS

This application claims the benefits of International Application No. PCT/CN2020/117975, filed Sep. 27, 2020, which claims priority to a U.S. provisional application No. 62/910,016, filled on Oct. 3, 2019. The entire disclosures of each of the applications are incorporated herein by reference.

TECHNICAL FIELD

The following disclosure relates to scheduling processes for sidelink transmissions in cellular networks.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

NR has added a lot of capabilities and technical features to the wireless strategies going way beyond LTE for operation on licensed spectrum. In addition, the NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of sidelink data transmission between a transmitter UE and a receiver UE, the method performed at the transmitter UE and comprising the steps of receiving a message from a base station scheduling resources for a sidelink transmission to the receiver UE, wherein the resources are for more than one repetition of at least one transport block (TB); transmitting at least one repetition of the at least one TB to the receiver UE using the resources; receiving HARQ feedback from the receiver UE after each repetition; if positive HARQ feedback is received transmitting that feedback to the base station prior to transmission of all scheduled repetitions.

The method may further comprise transmitting HARQ feedback to the base station after transmission of all scheduled repetitions if positive HARQ feedback has not previously been transmitted.

The method may further comprise stopping transmission of further repetitions of the TB after receipt of positive HARQ feedback.

The resources may be for transmission of more than one TB.

The message may also schedule uplink resources for transmission of the HARQ feedback to the base station from the transmitter UE after each repetition of the at least one TB.

The uplink resources may be scheduled for HARQ feedback relating to more than one TB.

The uplink resources may be part of a PUCCH group configured specifically for transmission of sidelink feedback.

There is also provided a method of sidelink data transmission between a transmitter UE and a receiver UE, the method performed at a base station to which at least the transmitter UE is connected and comprising the steps of transmitting a message to the transmitter UE scheduling resources for a sidelink transmission to the receiver UE, wherein the resources are for more than one repetition of at least one transport block (TB); receiving positive HARQ feedback from the transmitter prior to transmission of all scheduled repetitions; and reallocating resources previously scheduled for further repetitions of the transport block.

The resources may be for transmission of more than one TB.

There is also provided a method of sidelink data transmission between a transmitter UE and a receiver UE, the method performed at the transmitter UE and comprising the steps of receiving a message from a base station scheduling resources for a sidelink transmission to the receiver UE, wherein the resources are for more than one repetition of a transport block (TB); and transmitting at least one repetition of the TB to the receiver UE using the resources; if positive HARQ feedback is received utilising the resources for further repetitions of the TB to transmit a further TB.

The method may further comprise transmitting HARQ feedback to the base after successful transmission of all available TBs or after all scheduled resources.

The HARQ feedback may indicate the number of TBs that were transmitted.

There is also provided a method of transmitting control information from a base station to a UE, the method comprising configuring more than one CORESET for transmission of control information from a base station to a UE, wherein each CORESET utilises a different downlink carrier; at the base station selecting one of the CORESETs and transmitting control information to a UE using that CORESET; and at the UE blind decoding each of the configured CORESETs to receive control information transmitted on one of those CORESETs.

Each carrier may be associated to a different cell group.

The method may be performed at a base station and may comprise the steps of at the base station creating an independent PUCCH group for sidelink feedback transmissions from a sidelink UE to the base station; transmitting a DCI to the sidelink UE scheduling a sidelink transmission and including the PUCCH group for transmission of sidelink feedback to the base station; and receiving sidelink feedback from the sidelink UE on resources which are part of the PUCCH group.

The DCI may indicate specific PUCCH resources in the PUCCH group for transmission of sidelink feedback to the base station.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
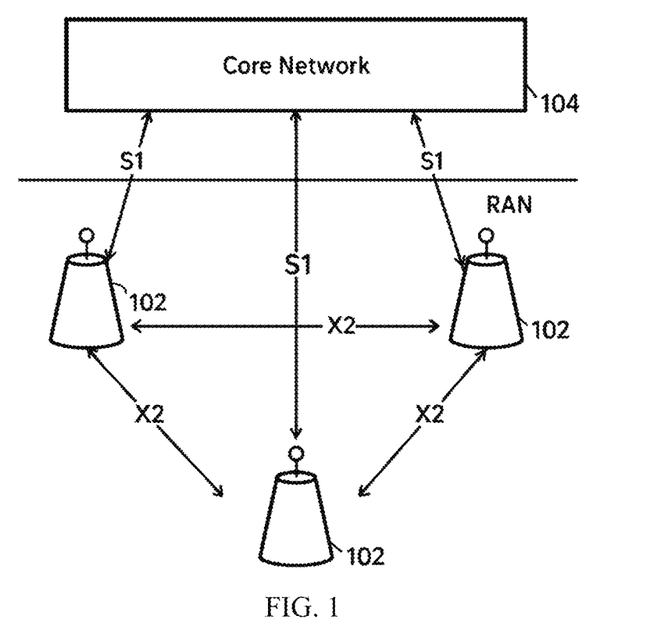
FIG. 1 shows selected elements of a cellular wireless communication network.

FIG. 1 shows a schematic diagram of three base stations 102 (for example, eNB or gNBs depending on the particular cellular standard and terminology) forming a cellular network. Typically, each of the base stations 102 will be deployed by one cellular network operator to provide geographic coverage for UEs in the area. The base stations form a Radio Area Network (RAN). Each base station 102 provides wireless coverage for UEs in its area or cell. The base stations 102 are interconnected via the X2 interface and are connected to a core network 104 via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations 102 each comprise hardware and software to implement the RAN's functionality, including communications with the core network 104 and other base stations 102, carriage of control and data signals between the core network and UEs, and maintaining wireless communications with UEs associated with each base station. The core network 104 comprises hardware and software to implement the network functionality, such as overall network management and control, and routing of calls and data.

In vehicle-to-vehicle (V2V) applications, the UEs may be incorporated into vehicles such as cars, trucks and buses. These vehicular UEs are capable of communicating with each other in in-coverage mode, where a base station manages and allocates the resources and in out-of-coverage mode, without any base station managing and allocating the resources. In vehicle-to-everything (V2X) applications, the vehicles may be communicating not only with other vehicles, but also with infrastructure, pedestrians, cellular networks and potentially other surrounding devices. V2X use cases include:

1) Vehicles Platooning—this enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

2) Extended Sensors—this enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced Driving—this enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

4) Remote Driving—this enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 2:
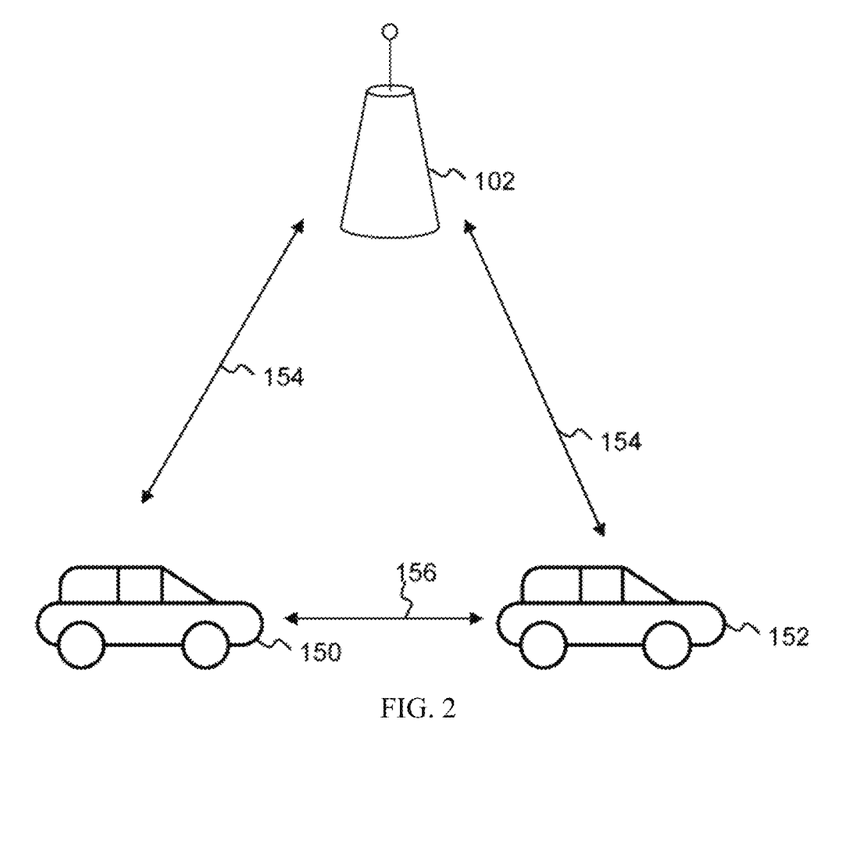
FIG. 2 shows selected elements in a Radio Area Network of the cellular wireless communication network of FIG. 1.

FIG. 2 illustrates a base station 102 forming a RAN, and a transmitter (Tx) UE 150 and a receiver (Rx) UE 152 in the RAN. The base station 102 is arranged to wirelessly communicate over respective connections 154 with each of the Tx UE 150 and the Rx UE 152. The Tx UE 150 and the Rx UE 152 are arranged to wirelessly communicate with each other over a sidelink 156.

Sidelink transmissions utilise TDD (half duplex) on either a dedicated carrier, or a shared carrier with conventional Uu transmissions between a base station and UE. Resource pools of transmission resources are utilised to manage resource and allocation and manage interference between potentially concurrent transmissions. A resource pool is a set of time-frequency resources from which resources for a transmission can be selected. UEs can be configured with multiple transmit and receive resource pools.

Two modes of operation are used for resource allocation for sidelink communication depending on whether the UEs are within coverage of a cellular network. In Mode 1, the V2X communication is operating in-coverage of the base stations (e.g., eNBs or gNBs). All the scheduling and the resource assignments may be made by the base stations.

Mode 2 applies when the V2X services operate out-of-coverage of cellular base stations. Here the UEs need to schedule themselves. For fair utilization, sensing-based resource allocation is generally adopted at the UEs. In Mode 2, UEs reserve resources for a transmission by transmitting a Sidelink Control Information (SCI) message indicating the resources to be used. The SCI notifies the recipient (which may be a single UE in unicast, a group of UEs in groupcast, or all reachable UEs in broadcast) of the details of the transmission it can expect. UEs may reserve transmission resources both for a first transmission of a Transport Block (TB) of data, and also for transmitting repetitions of the TB to improve reliability if the initial transmission fails.

In typical data transmission with Hybrid automatic repeat request (HARQ), a transmitter UE will send data, i.e., a TB, to a receiver UE. Upon receiving the data, the receiver UE sends, to the transmitter UE, an acknowledgement (ACK) or negative acknowledgement (NACK) indicating the status of the data reception. If the transmitter UE receives a NACK for the TB, the transmitter UE makes a re-transmission of the transport block if the maximum number of re-transmissions, if configured, has not reached.

When sidelink HARQ feedback is enabled for groupcast, two options are supported: Option 1: A receiver UE transmits HARQ-NACK on PSFCH if it fails to decode the corresponding TB after decoding the associated PSCCH. It transmits no signal on PSFCH otherwise. Option 2: A receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE.

When a sidelink transmission system is operating in Mode 1, the base station is responsible for scheduling resources for sidelink transmissions. In a dynamic grant system, the base station assigns resources when it receives a scheduling request (SR) or buffer status request (BSR) from a UE, or as a result of a RACH procedure. The assigned resources are signalled to at least the UE that wishes to transmit the sidelink message (Tx UE), for example in a DL DCI message. If a HARQ system is active for the sidelink transmission resources for multiple repetitions of a TB may be scheduled by a single DL DCI, which reduces control overheads. Thus, a single DCI may indicate multiple resources scheduling multiple repetitions of a transport block. However, if a TB is successfully decoded before all repetitions have been sent, the assigned resources may be wasted either due to continuing with unneeded repetitions, or by being unused if the Tx UE stops further repetitions after a TB is successfully decoded.

An Rx UE may be configured to transmit feedback on the sidelink feedback channel (PSFCH) after each repetition. The PSFCH utilises resources associated with the PSSCH used to transmit the TB according to the system configuration. Since PSFCH resources are typically automatically configured for each PSSCH, transmitting feedback after each repetition does not consume additional resources. The transmission of feedback after each repetition allows further repetitions to be cancelled if a TB is successfully received.

When a base station is handling resource allocation, in a first example, the Tx UE may transmit sidelink feedback to the base station (for example, on PUCCH) only once the time period for all repetitions has passed. This minimises transmission resources and power consumption for sending the sidelink feedback to the base station as only one transmission is required. However, if the TB is successfully received by the Rx UE before all transmissions are sent, the resources cannot be reused by the base station because the base station is not aware of the successful transmission until all resources have passed. This example also introduces latency as the feedback is not sent until the time for all repetitions have passed.

In a second example, the Tx UE transmits the sidelink feedback to the base station (for example, on PUCCH) after each repetition. Such a technique increases resource and power consumption, particularly since a number of NACK messages (which may not be useful to the base station) are typically transmitted before an ACK is sent. However, this example ensures the base station is aware of the status as quickly and frequently as possible.

In a third example, the Tx UE only transmits sidelink ACK messages, or sidelink feedback after all repetitions, (for example on PUCCH) to the base station. This example reduces transmission resource and power consumption compared to the first example, but ensures the base station is aware as soon as possible that a TB has been successfully received, and hence resources for further repetitions can be reassigned. In this example, PUCCH resources for the Tx UE to use for sidelink feedback after each repetition should still be assigned as it is not known in advance when a transmission will succeed and hence when the resources may be required.

The configuration for forwarding feedback to the base station may be defined according to system requirements. The configuration could be static, or variable, using for example, RRC signalling. Alternatively, dynamic configuration could be possible, even for each transmission, by including an indication in the scheduling message (DCI). The desired configuration can be assigned and implemented by the base station, or other network element, and indicated to the UEs. The base station may select the configuration based on network load, resource availability, and QoS requirements for the sidelink transmission.

There is therefore provided a method in which a base station schedules resources for more than one repetition of a TB on a sidelink transmission channel. The sidelink transmission is made using a HARQ system and the Tx UE of the sidelink transmission is configured to transmit feedback for the sidelink transmission to the base station. The Tx UE may send the sidelink feedback after each repetition, or after the time for all repetitions has passed. Furthermore, the Tx UE may be configured to only transmit positive (ACK) sidelink feedback to the base station after receipt from the Rx UE, and to transmit any sidelink feedback after all repetitions if an ACK has not been previously transmitted to the base station. The base station may use the received feedback to trigger reallocation of assigned resources.

In an alternative scheme, where resources for multiple repetitions of a TB on a sidelink transmission have been allocated, receipt of positive (ACK) feedback at the Tx UE may cause the Tx UE to use the remaining allocated resources for transmission of a subsequent TB. The Tx UE indicates in the relevant sidelink control channel (PSCCH) whether each transmission is a repetition of the TB for which the resources were scheduled, or transmission of a new TB. The Rx UE can thus decode and process the received transmission correctly. This process enables use of resources allocated for unrequired repetitions without forwarding sidelink feedback to the base station and without requiring subsequent scheduling messages over the Uu interface. In general this system enables a Tx UE to utilise allocated resources in an efficient manner by enabling the UE to decide when to move to transmission of the next TB. The base station is aware if a Tx UE has one or more TBs for transmission from the regular Buffer Status Reports (BSR) and can hence allocate multiple resources which can be used for repetitions and/or transmission of multiple TBs. Once all TBs have been transmitted a UE may forward feedback to the base station such that the base station can then reallocate any remaining resources. The feedback may indicate explicitly that more than one transport block has been transmitted using the resources allocated for the first TB. The indication may be sent as combined feedback for each of the TB and may be sent on the PUCCH resources indicated in the DL DCI message which scheduled the resources. Various techniques may be utilised to transmit feedback for multiple TBs such as bundling and multiplexing. Bundling may be simpler in terms of PUCCH management but is often inefficient.

A particular situation arises where a first TB is successfully transmitted and the Tx UE decides to use the resources allocated for unrequired repetitions to transmit a further TB. This second TB is likely to have fewer repetitions than would normally be allocated and so is less likely to be successfully decoded at the Rx UE. If the NACK for this TB is sent to the base station, confusion may arise as the base station may assume the NACK is for the original TB as the decision to transmit a second TB has been taken by the Tx UE. To avoid this feedback multiplexing may be utilised which will avoid confusion. If the base station is configured to activate feedback multiplexing it is implicitly assumed that the sidelink Tx UE may transmit more than one TB over the resources allocated by a single DCI. Additional blind decoding of a PUCCH transmission from the Tx UE may be required since the base station will not know how many TBs are acknowledged by the feedback transmission, and hence the exact size of the transmission is unknown. The number of possibilities is small as the highest possible number of TBs is the number of resources allocated. Alternatively, the maximum number of TBs that the sidelink Tx UE is permitted to transmit on the allocated resources may be limited by configuration, for example to two TBs.

In a modification of the processes described above, when a Tx UE has more than one TB for transmission (or amount of data requiring more than one TB) the Tx UE may send a single scheduling request for all of (or a subset of) the TBs. Also, the base station may allocate resources for all (or a subset) of the TBs related to a scheduling request or buffer status report and indicate this to the UE in a single DCI message. This technique may reduce control overhead and latency compared to transmitting a scheduling request and corresponding DCI for each TB. Known DCI formats for allocating multiple repetitions of a TB may be utilised to schedule multiple TBs by including an indication whether the resources are to be used for a single TB or multiple TBs. The resources for multiple TBs may be allocated in a periodic or pattern form from the resources for the first TB, which may reduce the size required to indicate the indication. If the scheduling is such that each of the TBs has more than one repetition, the methods proposed earlier for the transmission of feedback for multiple repetitions of a TB can be applied to the feedback of each individual TB. To highlight the design innovation for the case when multiple TBs are scheduled, the next embodiments assume that each TB has one feedback opportunity to the base station. This can be the case if each TB is scheduled with one repetition, or if only one feedback is expected/configured for all repetitions of a TB.

As discussed above, it can be beneficial for a Tx UE to forward sidelink feedback to the base station. Such sidelink feedback may be transmitted in a PUCCH transmission from the Tx UE to the base station. In a first example, the sidelink feedback for each TB transmission may be collected and transmitted in a single message on PUCCH after completion of transmissions. The DCI message indicating the resources allocated for the sidelink transmission(s) may also indicate resources for the PUCCH transmission. This example minimises the PUCCH resources required since only a single sidelink feedback transmission is made for all TBs, and also the DCI overhead for indicating the PUCCH resources is minimised. However, collecting all feedback into a single transmission may lead to significant latency in transmitting the feedback to the base station, which may not be acceptable for the sidelink service being provided.

To reduce the latency of feedback transmissions, multiple PUCCH resources may be allocated and indicated to the Tx UE in the DL DCI. For example, resources may be allocated after each transmission of a TB such that feedback can be transmitted by the Tx UE after each transmission. Although such a technique reduces the latency of feedback transmission to the base station, control overheads are increased due to the additional messages and also the increased size of the DCI messages. The size of the DCI messages may be particularly problematic as DCI messages are heavily encoded and hence require significant resources for transmission. Also, the size of the DL DCI is dependent on the number of TBs being scheduled leading to an increase in blind decoding complexity for the Tx UE as it tries to identify the correct DCI format.

In a further option, intended to address the high latency and control overheads of the above examples, when more than one TB transmission is scheduled a HARQ-time-delay and a PUCCH-resource-indication may be provided in the DL DCI which schedules resources. Transmission of feedback to the base station is delayed by the indicated HARQ-time-delay relative to a reference point. The reference point may be one of the PSSCH transmissions, or PSFCH received at the Tx UE. The HARQ-time-delay is applied to all transmissions indicated in the DCI. The Tx UE then transmits feedback for multiple transmissions on the resources indicated by the PUCCH-resource-indication in conjunction with the HARQ-time-delay value. That is, feedback for each single transport block is transmitted to the base station at the indicated PUCCH resource with the delay used for this TB. This is done for all TBs scheduled together. In essence, this method provides the indication of single feedback resource (e.g., PUCCH to transmit feedback to the base station) and single delay value, which are applicable for all TBs scheduled together. Thus, the Tx UE transmits the feedback to the base station for each TB applying the indicated values for feedback resource and delay. This reduces the latency of feedback, and also reduces the overhead requirements. The delay value can be set to give the required balance of latency and overhead.

Periodic sidelink transmission resources may be allocated by Type 1 configured grant, Type 2 configured grant, semi-persistent scheduling or other similar mechanisms to one or a set of UEs. The configuration indicates that each transport block transmitted over these periodic resources is to be transmitted for a given number of repetitions over the sidelink. An Rx UE may be configured to transmit HARQ feedback to a Tx UE for the transmissions received over periodic resources. That feedback may be transmitted by the Rx UE after all repetitions of a TB. The resources for HARQ feedback on PSFCH may be derived implicitly from the resources used for the data transmission (PSSCH) leading to the feedback. A delay between the PSSCH and PSFCH can be configured and may be specified as the number of slots since the last repetition of the TB. However, if the Rx UE is able to decode the TB before the last repetition any further repetitions after successful reception are unrequired and waste resources, and also the single feedback has high latency. In an alternative example HARQ feedback may be transmitted by the Rx UE after each repetition, such that the Tx UE can stop transmissions once an ACK is received. Spectral efficiency is thus improved because only the required number of repetitions are transmitted, and the remaining periodic resources may be used by the Tx UE for subsequent data in its buffer.

When a Tx UE transmits a TB on a sidelink to an Rx UE, and the Tx UE receives a NACK feedback, it retransmits the TB on the periodic resources with same number of repetitions as the initial transmission. The Tx should make the re-transmission up to a configured number of times, which may be specified in the sidelink configuration, for example as indicated by the base station to the Tx UE as part of the PSSCH configuration, or with the configuration of the periodic resources. A packet delay budget may also be specified such that even if the maximum number of retransmissions have not been made but the packet delay budget is exceeded, transmission is stopped as its further transmission is a waste of transmission resources. The packet delay budget may be specified in configuration and communicated from higher layers in higher layer messaging or may be derived from other parameters.

In summary if a sidelink Tx UE does not receive acknowledgement of successful receipt of a TB the Tx UE re-transmits the TB using the same configuration as the initial configuration using the configured periodic resources. A further scheduling request to the base station is not transmitted prior to the retransmission, but rather the existing periodic resources are utilised. A maximum number of re-transmissions may be specified, and a packet delay budget may also be specified to limit the number of retransmissions attempted.

Figure 3:
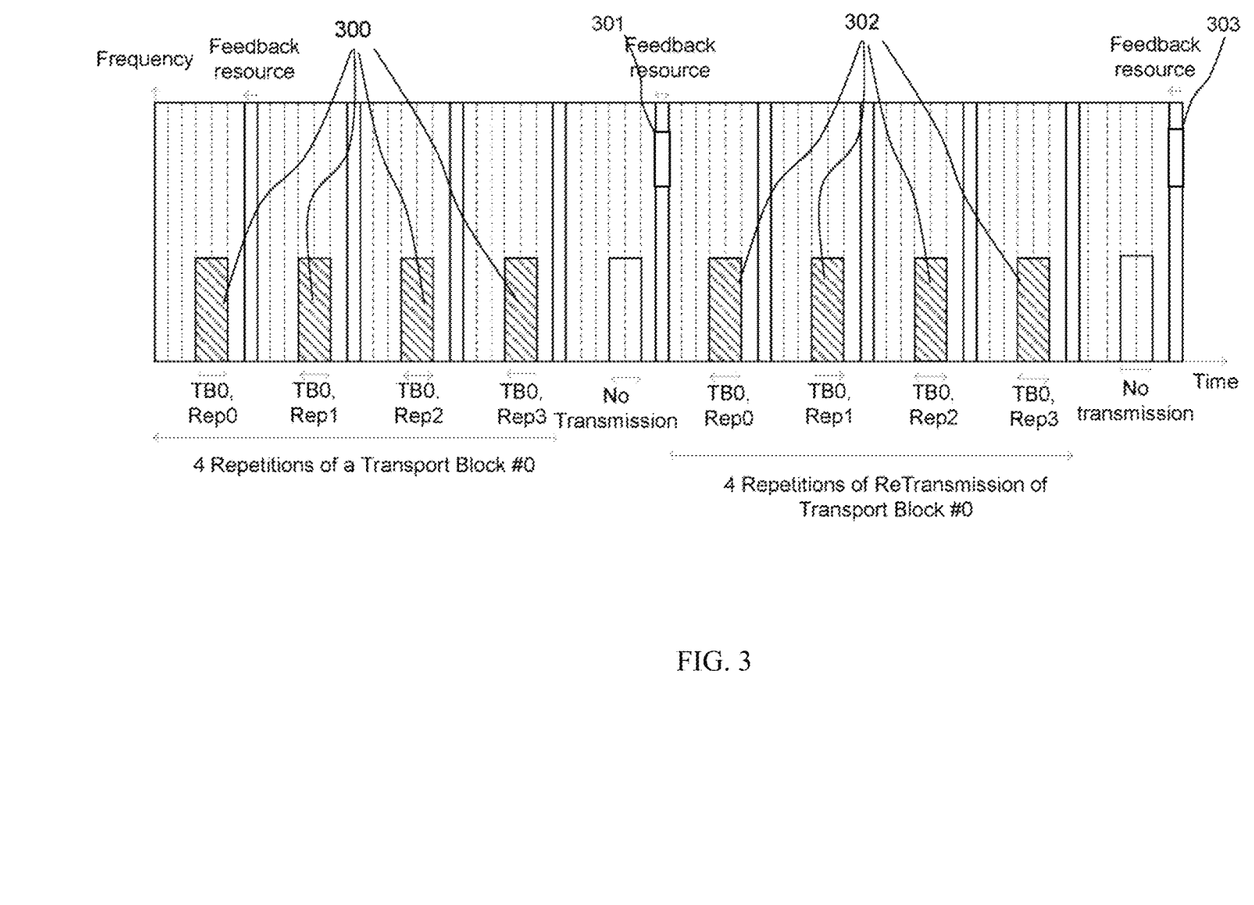
FIG. 3 shows an example of retransmissions.

FIG. 3 shows an example in which a sidelink Tx UE is configured with periodic transmission resources using configured grant with 4 repetitions. TB0 is transmitted for 4 repetitions 300, and then the Tx UE receives a NACK 301 from the Rx UE on PSFCH and retransmits TB0 a further 4 times 302, without a scheduling request to the base station. After the retransmissions the Rx UE successfully receives TB0 and transmits an ACK 303 to the Tx UE which can proceed to transmit further data from its buffer using the periodic resources.

In order to improve the ease with which defined numbers of repetitions or retransmissions can be stopped after reception of an ACK control information may be transmitted explicitly to the Rx UE with each transmission. For example, HARQ ID and redundancy version may be sent to the Rx UE. Such information may be transmitted in the SCI message on PSSCH, or encoded in the DMRS of PSCCH/PSSCH, or other channel.

As discussed above, for sidelink transmissions using dynamic grants the Tx UE may send the sidelink feedback to the base station to allow reuse of the allocated resources. However, for periodic resources transmitting the feedback to the base station will increase the feedback overheard significantly, and the feedback may be of little value to the base station. Therefore, where periodic resources are utilised feedback may not be sent to the base station, but rather the Tx UE utilises the allocated periodic resources as it considers best for retransmissions or transmission of further TBs after the first one.

If feedback for the sidelink transmissions is not sent to the base station, status reports may be useful for the base station to be aware of the link status and ongoing activity using the periodic resources. The Tx UE may therefore transmit a periodic status report to the base station to indicate utilisation of the periodic resources. The requirement for, and period of, the status report may be defined as part of the periodic resource allocation & configuration. The status report may include utilisation information, data such as success rate for packets transmitter over the sidelink channel, number of packets, and/or average number of retransmissions before successful transmission, for example in a defined internal. The status report may also include information such as the average MCS, or an indication of the amount of data transmitted in a given interval.

Instead of, or as well as, a periodic sidelink status report, the base station may trigger such a status report when required. For example, if a base station knows a-priori the sidelink information because both sidelink Tx and sidelink Rx (s) are in coverage of the same base station, or triggering a report may allow the base station to choose the time interval over which it wishes to receive the status information.

Although transmitting feedback information to the base station for periodic resource allocations is not generally desirable, for transmissions with very strict QoS requirements transmission may be permitted. However, in such cases the feedback is preferably sent as soon as it is received by the Rx UE, and not wait until completion of all repetitions. To enable this a periodic PUCCH resource may be assigned to the Tx UE for transmission of feedback from the Rx UE.

When operating under control of a base station (Mode 1) sidelink channels may be configured over a shared carrier. For example, a sidelink may share with a UL carrier in a paired spectrum, and sidelink may shared with UL-DL in unpaired spectrum. Sidelink channels may also be configured over a dedicated carrier. In both cases, when operating in Mode 1, each UE is configured with a suitable control resource set (CORESET) in the downlink resources such that each UE can receive DL DCI (s) scheduling sidelink transmissions.

Cellular networks typically have the ability to configure multiple active DL and UL carriers. For example, LTE 4G allows up to 32 DL carrier, and 5G NR in 3GPP Release-15 allows up to 16 DL carriers. In such configurations, if there is only one DL carrier configured to provide sidelink scheduling commands, this may be an issue in case of heavy traffic situations in the DL for this carrier. The available control resources may be a limiting factor even if transmission resources are available on the sidelink channel. This restriction may be alleviated by allowing flexible configuration of CORESETs on more than one DL carrier which can be used by the base station to transmit DL DCI (s) with sidelink scheduling information. In an example, the base station may configure more than one CORESET, each on a different DL carrier. The CORESETs may be configured dynamically depending on network load conditions, and the currently configured CORESETs used to transmit a DCI message to schedule a sidelink transmission. Each UE is configured with the possible CORESET configurations over more than one DL carrier, and each UE performs blind decoding on the possible CORESETs to receive any DCI scheduling its transmissions. Such a configuration may be attractive for UEs operating in Uu dual connectivity configurations, where the master cell group (MCG) and secondary cell group (SCG) may send sidelink scheduling commands on different DL carriers.

A number of sidelink applications and QoS requirements are possible, with a wide range of latency, reliability, and throughput targets. Restricting sidelink channels to a single carrier may lead to an inability to meet all requirements. For example, a sidelink sub-carrier spacing (SCS) of 15 KHz may be suitable for a number of applications, but for latency critical applications, the large scheduling intervals, round trip times, and feedback intervals of such an SCS value may compromise the latency target. Furthermore, a single carrier may have insufficient capacity to support all requirements. These restrictions may be addressed by permitting multiple sidelink carriers per UE. Each UE may therefore have more than one active sidelink carrier for transmission and reception of sidelink data.

The use of multiple active sidelink carriers may enable different QoS constraints of services to be accommodated. For example, two sidelink carriers may be configured with two different SCS, one with 15 KHz and the other with 60 KHz. The 60 KHz SCS carrier may be used for latency-critical services since the slot timings are one quarter of the 15 KHz SCS, making the wait time, transmission time, and HARQ time faster compared to the 15 KHz SCS carrier.

The base station may thus schedule services over sidelink carriers best-suited to the technical requirements of the service. The various parameters, such as time between DCI and the sidelink transmission, the delay between sidelink data and sidelink HARQ, the delay before forward feedback over the Uu interface can be configured according to the carrier configuration and service requirements.

The use of multiple active sidelink carriers also allows a system to utilize fragmented spectrum to support sidelink channels. For example, if a large contiguous frequency range is not available the bandwidth available for a single sidelink carrier may be insufficient. A network may thus configure multiple sidelink carriers, each in a separate region of available spectrum, in order to provide the required capacity and QoS.

Carrier information for a sidelink transmission may be indicated by a base station in the DL DCI scheduling the transmission. For example, a carrier indicator may be included indicating the carrier to utilize. In an example the field may comprise zero (if not configured in RRC signaling, or only a single carrier is configured) or three bits (indicating the carrier). Alternatively, each sidelink carrier may be associated with a DL carrier, such that the DL carrier on which a DL DCI is received implicitly indicates the sidelink carrier on which the transmission is scheduled. The association may be that the same carrier is used for the DL DCI and sidelink transmission in unpaired spectrum. The association between DL carrier and sidelink carrier may be configured with the sidelink carrier configuration.

Cross-carrier scheduling of sidelink carriers may allow greater scheduling flexibility. Sidelink carriers may thus be configured with a cross carrier scheduling configuration and be configured from different DL carriers. The sidelink configuration provides the set of DL carriers through which a given sidelink carrier can be configured. When a sidelink carrier is configured for cross carrier scheduling by RRC signaling, the carrier indicator field in the sidelink scheduling DCI may comprise of three bits to indicate the target sidelink carrier.

Multiple active sidelink carriers can be useful when the sidelink UE is operating under dual connectivity for cellular operation. Although the two cell groups in dual connectivity, namely MCG and SCG, may share a sidelink carrier or multiple sidelink carriers, letting each of the MCG and SCG maintain one sidelink carrier may make the operation more simple and efficient. This way, each cell group can define its DL carrier to send DL DCI scheduling the sidelink, its own sidelink carrier and its own UL carrier for potential HARQ information transfer back to the base station.

NR-Uu allows up to 4 BWP configurations per carrier but only a single BWP is active for a carrier at a given time, which is anticipated to be a workable configuration for sidelink operation.

As discussed above, it may be desirable for a Tx UE to forward sidelink feedback information to the base station. The Tx UE can transmit the sidelink feedback to the base station as Uplink Control Information (UCI). For example, the sidelink feedback can be transmitted on the PUCCH the Tx UE uses to send feedback for DL data. A single PUCCH group may be configured for the sidelink Tx UE. The group may comprise multiple PUCCH resources and the UE may be indicated to use a specific PUCCH resource from the configured PUCCH group.

A single shared PUCCH group may facilitate the configuration and may be resource efficient. However, if the base station (cellular network) with a large number of Uu and sidelink connections has configured all (or most) of the UEs with a single common PUCCH group, managing and allocating PUCCH resources may become difficult. For NR-Uu, DCI scheduling the DL data provides the specific PUCCH resource in the PUCCH group which should be used to transmit HARQ feedback for this TB. This indication is called "PUCCH-Resource-Indicator". For the Uu interface, this indicator uses the parameters of scheduled DL data in its mapping to given time-frequency PUCCH resource. If the PUCCH group is shared for DL data and sidelink data, a problem may occur in defining the mapping from "PUCCH-Resource-Indicator" to the physical PUCCH resource. This stems from the fact that multiple DL transmissions will inherently have different DL shared channel resources, which will allow different physical PUCCH resources to be mapped for different transmissions/UEs. Different sidelink transmissions will also have different resources but there is a possibility of collision between PUCCH resources, among sidelink and DL transmissions. This may be mitigated by defining a mapping from sidelink resources, and ensuring that there is never a PUCCH resource overlap with Uu and sidelink transmission. This may increase the complexity and may be resource inefficient as well.

In an example, an independent PUCCH group may be created for the sidelink feedback transmissions from sidelink UEs to the base station. This will avoid collisions with PUCCH mappings resulting from DL transmissions. One advantage of an independent PUCCH group for sidelink is flexibility in defining how the "PUCCH-Resource-Indicator" will provide the mapping to the actual PUCCH resource. Although this mapping can be defined different from Uu mapping but if PUCCH group is certain to be independent among sidelink and DL, "PUCCH-Resource-Indicator" to the physical PUCCH mapping can be the same for sidelink shared channel as in the DL shared channel. An independent PUCCH group configuration for the sidelink UE can be defined as the UE capability. Further the sidelink PUCCH group can have the same numerology or a different numerology than the PUCCH group relevant for Uu DL transmissions.

The disclosure herein has focused primarily on sidelink HARQ feedback transmitted to the base station on PUCCH resources, but is also applicable to sidelink scheduling requests, channel state information, and other sidelink control information which the sidelink Tx UE needs to send to the base station. The principles described above may thus be applied to the transmission of sidelink scheduling request, sidelink channel state information, RSRP reports and other sidelink relevant control information, in addition to the sidelink HARQ feedback.

In order to separate DL-relevant PUCCH and sidelink-relevant PUCCH, the base station can configure the sidelink UEs to send the HARQ feedback for the sidelink data on a specific Uu UL carrier. This UL carrier can be different from the UL carrier associated to the DL carrier providing scheduling commands, or the primary carrier of the cell group. This can be achieved by configuring the PUCCH group for sidelink on an independent UL carrier.

Having a sidelink-dedicated PUCCH group to convey sidelink HARQ feedback and control information to the base station can be defined in terms of UE capability. The numerology of the sidelink PUCCH group, the UL carrier where sidelink PUCCH group is configured, can be the same or different from the PUCCH group configured to carry DL HARQ feedback and other Uu-relevant control information.

3GPP NR Rel-15 allows up to two PUCCH groups for Uu operation, defining an additional PUCCH group for sidelink will result in UE capability where it supports up to 2 PUCCH groups for Uu relevant control information and one PUCCH group for sidelink relevant control information. Further different numerologies for different PUCCH groups should be supported to be able to have configuration suitable for certain application scenarios.

Throughout this disclosure the terms Tx UE and Rx UE are used to refer to a transmitter/receiver pair transmitting over a sidelink channel.

As will be appreciated, the techniques described herein may be applicable to all types of sidelink transmission, and in particular to unicast, groupcast and broadcast transmissions.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of sidelink data transmission between a transmitter user equipment (UE) and a receiver UE, the method performed at the transmitter UE and comprising steps of:
    receiving a message from a base station scheduling resources for a sidelink transmission to the receiver UE, wherein the resources are for more than one repetition of at least one transport block (TB);
    transmitting at least one repetition of the at least one TB to the receiver UE using the resources;
    receiving hybrid automatic repeat request (HARQ) feedback from the receiver UE after each repetition, wherein the transmitter UE stops transmissions once an acknowledgement (ACK) is received, and remaining periodic resources are used by the transmitter UE for subsequent data in a buffer;
    if positive HARQ feedback is received transmitting that feedback to the base station prior to transmission of all scheduled repetitions;
    wherein in a case where multiple repeated resources have already been allocated for sidelink transmission of a previous TB, a reception of an ACK feedback by the transmitter UE causes the transmitter UE to use remaining allocated resources for a transmission of a next TB;
    the sidelink transmission shares an uplink (UL) carrier in a paired spectrum, the sidelink transmission shares UL-downlink (DL) in an unpaired spectrum.

2. The method according to claim 1, further comprising: transmitting HARQ feedback to the base station after transmission of all scheduled repetitions if positive HARQ feedback has not previously been transmitted.

3. The method according to claim 1, further comprising: stopping transmission of further repetitions of the TB after receipt of positive HARQ feedback.

4. The method according to claim 1, wherein the resources are for transmission of more than one TB.

5. The method according to claim 1, wherein the message also schedules uplink resources for transmission of the HARQ feedback to the base station from the transmitter UE after each repetition of the at least one TB.

6. The method according to claim 5, wherein the uplink resources are scheduled for HARQ feedback relating to more than one TB.

7. The method according to claim 5, wherein the uplink resources are part of a physical uplink control channel (PUCCH) group configured specifically for transmission of sidelink feedback.

8. A method of sidelink data transmission between a transmitter user equipment (UE) and a receiver UE, the method performed at the transmitter UE and comprising steps of:
    receiving a message from a base station scheduling resources for a sidelink transmission to the receiver UE, wherein the resources are for more than one repetition of a transport block (TB); and transmitting at least one repetition of the TB to the receiver UE using the resources;
if positive hybrid automatic repeat request (HARQ) feedback is received utilising the resources for further repetitions of the TB to transmit a further TB;
receiving HARQ feedback from the receiver UE after each repetition, wherein the transmitter UE stops transmissions once an acknowledgement (ACK) is received, and remaining periodic resources are used by the transmitter UE for subsequent data in a buffer;
wherein in a case where multiple repeated resources have already been allocated for sidelink transmission of a previous TB, a reception of an ACK feedback by the transmitter UE causes the transmitter UE to use remaining allocated resources for a transmission of a next TB; the sidelink transmission shares an uplink (UL) carrier in a paired spectrum, the sidelink transmission shares UL-downlink (DL) in an unpaired spectrum.

9. The method according to claim 8, further comprising:
transmitting the HARQ feedback to the base station after successful transmission of all available TBs or after all scheduled resources.

10. The method according to claim 9, wherein the HARQ feedback indicates a quantity of TBs that were transmitted.

* * * * *